United States Patent [19]

Hunter

[11] 4,274,583
[45] Jun. 23, 1981

[54] MOISTURE AND PRESSURE RESPONSIVE IRRIGATION SYSTEM

[75] Inventor: Edwin J. Hunter, Rancho Santa Fe, Calif.

[73] Assignee: The Toro Company, San Marcos, Calif.

[21] Appl. No.: 55,182

[22] Filed: Jul. 6, 1979

[51] Int. Cl.³ ............................................. A01G 25/16
[52] U.S. Cl. ........................................ 239/1; 137/883; 137/885; 137/78.3; 239/64; 239/66; 239/207; 239/570; 239/DIG. 15
[58] Field of Search ................... 239/1, 11, 63, 64, 66, 239/76, 110, 120, 200, 207, 570, DIG. 15, 266; 137/78, 599, 883, 885

[56] References Cited

U.S. PATENT DOCUMENTS

| | | | |
|---|---|---|---|
| 1,494,497 | 5/1924 | May | 239/201 X |
| 3,831,681 | 8/1974 | Livingston | 239/207 X |
| 3,948,285 | 4/1976 | Flynn | 239/570 X |
| 3,981,446 | 9/1976 | Hunter | 239/63 X |

Primary Examiner—Andres Kashnikow
Attorney, Agent, or Firm—Poms, Smith, Lande & Rose

[57] ABSTRACT

An irrigation system and method is disclosed having a water supply source for providing water under pressure to a plurality of dispensing devices located at spaced locations. The irrigation system and method comprises a distribution conduit grid in fluid communication with the water supply source and defining a closed conduit loop, thereby providing water flow upon demand within the distribution conduit in more than one direction. The distribution conduit grid is composed of arterial members formed in a closed conduit loop for supplying water to a plurality of dispensing conduit members, each dispensing conduit member having its ends interconnected between two spaced locations on the arterial conduit members, thereby providing water flow into the dispensing conduit members from more than one direction. The dispensing devices are mounted on the dispensing conduit members in water supply relation. The dispensing devices are operated between open and closed positions by a water operated pilot valve. The water operated pilot valve is in turn controlled by a moisture responsive switch which is dependent upon air being passed or not passed through a ceramic material whose ability to pass air depends upon its moisture content. In addition, the water operated pilot valve is kept in the closed position by a pressure responsive switch which prevents opening of the water operated pilot valve except when water pressure at the water operated pilot valve is equal to or in excess of a predetermined level.

4 Claims, 9 Drawing Figures

MOISTURE AND PRESSURE RESPONSIVE IRRIGATION SYSTEM

BACKGROUND OF THE INVENTION

1. Field of the Invention

The present invention relates to systems and methods of agricultural irrigation. More specifically, the present invention relates to systems and methods of automatic agricultural irrigation in response to varying moisture demands within the area to be irrigated.

2. Description of the Prior Art

Conventional systems and methods of agricultural irrigation involve the use of a water supply source supplying water through a relatively large diameter pipe over a relatively short period of time. In this type of system, a pressure gradient is set up wherein the dispensing devices closest to the water supply are operated at a higher pressure than the dispensing devices further away from the water supply. Since most dispensing devices, such as sprinklers, operate optimally within a given pressure range for a given volume flow rate, it would be desirable to have a system where each individual dispensing device was operated at its particular optimal pressure. This would ensure predictable water distribution patterns which would be reproducible and would also be helpful in planning the irrigation system.

A major cost of conventional irrigation systems is the pipe for distributing water from the water supply source to the dispensing devices. Substantial cost savings could be realized if the diameter of the distributing pipe could be reduced without reducing water volume to the dispensing devices while they are operating. Additionally, it would be desirable to operate the dispensing devices in response to the moisture demands of each dispensing device's environment.

An adequate irrigation system could be devised where different portions of the system being supplied by a single water supply source are operated individually in response to the moisture demands of the environment of the portion while maintaining water pressure within the portion at an optimal level. However, the best irrigation system would involve the individual automatic operation of each dispensing device in response to the moisture demand of its environment with a pressure limiting device for allowing operation of each dispensing device only at or above optimal operation water pressure.

Operation of such a system in agricultural settings such as lawns, golf courses, agricultural fields and even areas of trees or plants which may be potted or planted, raises a practical problem of how to provide for such individual automatic operation. Certainly, electrical switching means could be utilized, however, water operated control devices such as that disclosed in my prior application for U.S. Letters Patent Ser. No. 499,485 filed Aug. 22, 1974 and now U.S. Pat. No. 3,981,446 entitled "WATER OPERATED CONTROL APPARATUS AND METHOD" would be particularly suited for use in this type of irrigation system. In this patent, I disclosed a water operated control apparatus and a method for operating a controlled device wherein the water operated control apparatus was associated with a moisture sensing apparatus such as a porous ceramic or plastic material with the ability to pass air or not depending upon the amount of water saturation therein. Although this device is commonly used for operating numerous types of devices and valves, heretofore, it has not been used in combination with a pressure sensor for individual operation of dispensing devices, such as sprinklers, within an irrigation system, as is contemplated herein.

SUMMARY OF THE INVENTION

In view of the foregoing, it is a primary object of the present invention to disclose and provide a system and method of agricultural irrigation wherein water under pressure is continually supplied to individual dispensing devices in response to moisture demand in the area surrounding each dispensing device.

It is another object of the present invention to supply water flow under pressure to each dispensing device from more than one direction within the irrigation system thereby permitting the reduction of distribution pipe diameter with no reduction in water volume of the dispensing device.

It is a further object of the present invention to disclose and provide an irrigation system that is entirely automatic in operation and is responsive to moisture demands of individual areas within the area to be irrigated. The automatic operation being provided by water actuated control devices.

It is another object of the present invention to disclose and provide an irrigation system wherein the individual dispensing devices, such as sprinklers are prevented from operating except at water pressures equal to or in excess of a predetermined level, thereby ensuring optimal water dispensment.

It is still a further object of the present invention to disclose and provide an irrigation system and method which is solid state in nature, providing continual water flow throughout the system available to individual dispensing devices upon moisture responsive demand with the number of dispensing devices operable at one time being limited by pressure sensing means, calibrated for operation of the dispensing devices at or above a predetermined level, thereby ensuring that the water pressure within the distribution pipe remains equal to or in excess of the desired level.

Generally stated, the irrigation system and method of the present invention includes distribution conduit means in fluid communication with a water supply source for distributing water under pressure to a plurality of dispensing devices located at spaced locations. The distribution conduit means forms a closed loop with the water supply source, thereby providing water flow upon demand to any point in the loop from more than one direction. The distribution conduit means may be viewed as a conduit grid having arterial and grid or dispensing conduit members with the arterial conduit members, forming a closed loop with the water supply source, as a means for introducing water into a plurality of dispensing conduits. The dispensing conduits have each of their ends interconnected between two spaced locations on the arterial conduit members thereby providing water flow into each dispensing device from more than one direction. Additionally, means are provided for mounting the dispensing devices in water supply relation to the dispensing conduits.

Dispensing valve means, such as a water operated pilot valve, are provided for individually switching the dispensing devices between on and off operation. Control valve means are provided for operating the dispensing valve means in response to moisture content of the soil surrounding each of the dispensing devices and additionally, in response to water pressure in the dispensing conduit at or adjacent to each dispensing device.

This results in an irrigation system which is responsive to moisture variations within the environment of the system while maintaining water pressure within the system at or above a predetermined level by selective operation of individual dispensing devices within the agricultural irrigation system.

Reference will be made to the appended sheets of drawings, which will now be explained briefly before commencing the detailed description of the preferred exemplary embodiment of the method and system of agricultural irrigation of the present invention.

BRIEF DESCRIPTION OF THE DRAWINGS

FIG. 5 is also the same view as FIG. 3, however, FIG. 5 shows the control apparatus after the area surrounding the control apparatus has been thoroughly irrigated. This is demonstrated by the water which is shown remaining in the central portion of the control apparatus.

FIG. 6 is a detailed view of the top left-hand portion of FIG. 5 taken in the plane VI—VI of FIG. 5. This figure demonstrates how water is transferred from the top chamber 122, via the chamber drain cup, to the bottom chamber 121.

FIG. 7 is an even more detailed view of FIG. 6 taken in the plane VII—VII of FIG. 6 showing the top chamber drain cup 135 and the drain cup orifice 136.

DESCRIPTION OF THE PREFERRED EMBODIMENT

Figure 2:
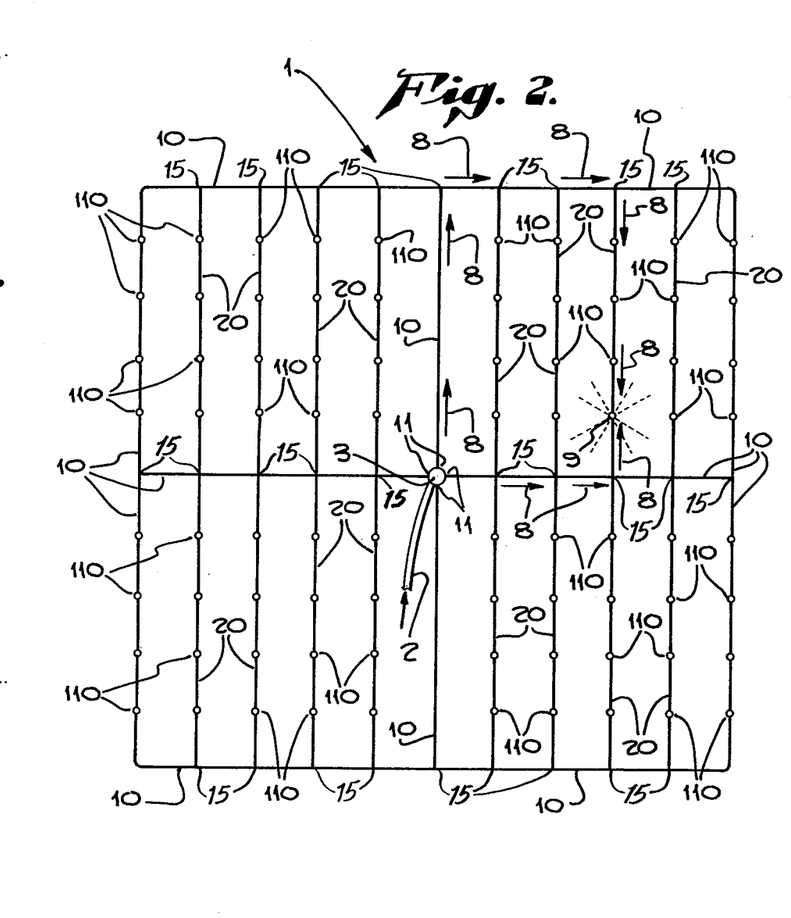
FIG. 2 is a top view of the irrigation system of the present invention showing the distribution grid and demonstrating, via arrows, flow of water to a particular sprinkler.

Referring first to FIG. 2 of the drawings, a general layout of the preferred embodiment of the irrigation system of the present invention is shown. Water is supplied to this preferred irrigation system from a water supply source providing water under pressure through a main supply conduit 2. A centrally located main water supply valve 3 is provided for permitting on and off operation of the entire irrigation system simultaneously.

A distribution conduit means for providing water flow upon demand, such as the depicted conduit grid indicated generally at 1, is in fluid communication with the main water supply valve 3. As can be seen, the distribution conduit grid is connected to the main water supply valve 3 at four locations 11. These connections can be accomplished by any conventional plumbing requirements deemed necessary. The important aspect of the distribution conduit grid 1 is that it defines a closed loop thereby providing water flow upon demand within the distribution conduit grid 1 in more than one direction. However, it should be noted that the concept of the present invention can be applied to any conventional distribution conduit grid configuration.

The distribution conduit grid shown generally at 1 in FIG. 2 can be viewed as having two basic components. These components are arterial conduits 10 and dispensing conduits 20. In the preferred exemplary embodiment of the present invention, the arterial conduits 10 are shown forming four equivalent squares, each square defining a closed loop with the main water supply valve 3. The arterial conduits 10 may be connected to each other by any conventional plumbing means such as elbow joints or T-joints.

Means are provided for introducing water into the arterial conduits 10 at 11 by way of any conventional plumbing connections between the arterial conduits 10 and the main water supply valve 3. The dispensing conduits 20 are shown as having each end interconnected between two spaced locations on the arterial conduits 10, thereby providing water flow into the dispensing conduits from more than one direction. These connections between the dispensing conduits 20 and arterial conduits 10 may be accomplished as at intersection 15 by conventional plumbing means such as T-joints, so long as, the freeflow of water within the arterial conduits 10 is not obstructed.

FIG. 2 shows the preferred embodiment of the irrigation system of the present invention in operation, with arrows 8 indicating water flow to a single operating dispensing device 9. Since the dispensing device 9 receives water from two directions within the distribution conduit means 1, a smaller diameter conduit may be used to achieve the same water volume as obtainable by a larger conduit distribution grid with water flowing in only one direction.

It should be noted that FIG. 2 shows the preferred embodiment of the present invention as having dispensing devices 110 mounted on four of the arterial conduits 10. It should be noted that mounting of dispensing devices 110 on the arterial conduits is not important to the closed loop design of the arterial conduits 1 and can be added or left off as convenience permits. Dispensing devices 110 are shown in FIG. 2 as mounted on the distribution conduit grid 1.

Means for mounting the dispensing devices 110 in water supply relation on the distribution conduit means shown generally at 1 are provided. Such means may include any conventional plumbing attachment such as a T-joint or other connecting pipe which would not obstruct free flow of water within the dispensing conduits 20. Means for mounting the dispensing device 110, according to the preferred embodiment of the present invention, will be described in detail later.

Means are provided for operating the dispensing device 110 in response to moisture content of the environment surrounding each dispensing device 110. Such means may alternatively be referred to as a moisture responsive switch. In addition, means are provided for operating the dispensing devices 110 only when water pressure equal to or in excess of a predetermined level is applied to each dispensing device 110. Each of these two means will be described in greater detail later. Presently, however, the general operation of the preferred exemplary embodiment of the irrigation system of the present invention will be described.

As a general rule, when the main water supply valve 3 is initially turned on to supply water to the distribution conduit grid 1, all of the moisture responsive means will be demanding water for their dispensing device 110. Conventionally, this would result in all of the dispensing devices 110 operating simultaneously. However, the dispensing devices 110 farthest away from the main water supply valve 3 would be operating at a reduced pressure relative to the dispensing devices located in closer proximity to the main water supply valve 3. The pressure control means, of the present invention, prevents this from occurring by allowing operation only of those dispensing devices 110 which are receiving a water pressure equal to or in excess of a predetermined amount. In operation, this generally results in the dispensing devices closest to the main water supply valve 3 being operated first. The main water supply valve is left open for a designated period of time, such as two hours, to allow for irrigation of the surrounding areas in proximity to the dispensing devices 110 which are in operation. After the designated period, the main water supply valve 3 is turned off for a short period of time, such as two minutes. This short period of time allows for proper operation of the moisture responsive and pressure responsive means. Upon reopening the main water supply valve 3, the initial set of operating dispensing devices are turned off automatically by their respective moisture responsive means and another set of water demanding dispensing devices are allowed to operate.

It can be seen, that once the irrigation system of the present invention has been allowed to operate over a period of time that individual dispensing devices will demand water via their moisture responsive control means and will be supplied the water pending the availability of water pressure within the distribution grid conduit 1 equal to or in excess of a predetermined level, with this level being determined by the number of dispensing devices operating at a given time. Of course, a water supply source providing sufficient water pressure to operate all the dispensing devices, in a given irrigation system, simultaneously at or above a predetermined water pressure is possible, however, such a system is not as efficient and would cost a great deal more in increased conduit costs as compared to the preferred exemplary embodiment of the present invention as described.

Figure 1:
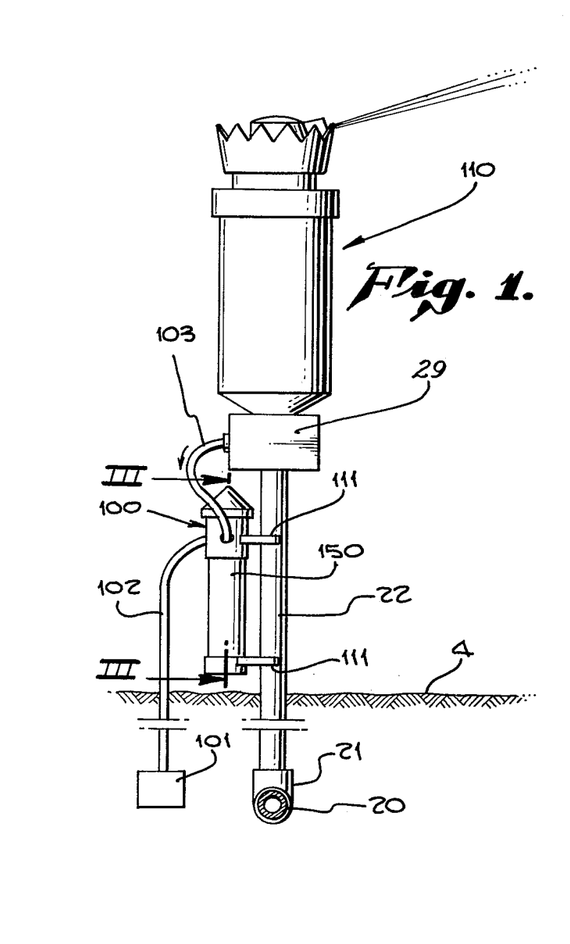
FIG. 1 is a perspective view showing the stream rotor sprinkler with rotating deflectors of my copending patent application Ser. No. 784,051 which is now U.S. Pat. No. 4,198,000 mounted on a water actuated pilot value which in turn is connected to a sprinkler pipe for supplying water to the stream rotor sprinkler. Also shown in a device mounted on the sprinkler pipe for controlling operation of the pilot valve. The device is a modification of the water operated control apparatus disclosed in my prior patent application Ser. No. 499,485, which is now U.S. Pat. No. 3,981,446. The soil level is also depicted to show the relative positioning of the stream rotor sprinkler and related control devices.

Any conventional dispensing device such as a bubbler, drip or free flow head can be used in conjunction with the present system. However, the preferred exemplary embodiment of the agricultural irrigation system of the present invention employs a stream rotor sprinkler with rotating deflectors. This particular sprinkler is the subject of my copending patent application Ser. No. 784,051 filed on Apr. 4, 1977. The stream rotor sprinkler with rotating deflectors is employed in the present invention because of its economical operation at relatively low pressures, the teachings of which are incorporated herein by reference. The stream rotor sprinkler with rotating deflectors is shown at 110 in FIG. 1 and will be referred to subsequently as sprinkler head 110. Referring to FIG. 1, the sprinkler head 110 is mounted on a dispensing conduit 20.

The means for mounting the sprinkler head 110 are provided by a T-joint 21 connected to the dispensing conduit 20 which in turn is connected to a sprinkler pipe 22 which extends up out of the ground 4 and into a water operated pilot valve 29 with the sprinkler head finally being secured to the water operated pilot valve 29. The above described mounting means dealt with dispensing conduits 20, the mounting means for the conduit grid 1 are the same, except for possible changes in size of the joints.

Pilot valve means are provided for by a water operated pilot valve 29. The water operated pilot valve 29 is operable between open and close positions in response to water flow within the pilot valve tube 103. When no water is allowed to flow from the water operated pilot valve 29 through the pilot valve tube 103, the water operated pilot valve 29 is in the closed position which renders the sprinkler head 110 inoperable. As water is allowed to flow through the pilot valve tube 103 from the water operated pilot valve 29, the water operated pilot valve 29 is operated to an open position which allows water to flow to the sprinkler head 110 and thus operate. The water operated pilot valve 29 could be any of the variety of water actuated pilot valves commonly employed in irrigation systems.

Moisture responsive and pressure responsive means are provided for by a water operated control device shown generally at 100 in FIG. 1. The water operated control device 100 is attached to the sprinkler pipe 22 by mounting brackets 111. The water operated pilot valve 29 is controlled by the water operated control device 100. This water operated control device is responsive to moisture demand of the surrounding environment and responsive to pressure within the pilot valve tube 103, wherein water pressure within the pilot valve tube 103 must be equal to or in excess of a predetermined amount before it will be allowed to flow.

The water operated control device 100 is a modification of the water operated control apparatus of my prior patent application Ser. No. 499,485 now U.S. Pat. No. 3,981,446 issued Sept. 21, 1976. The water operated control device 100 is a modification, in particular, of the first alternative exemplary embodiment disclosed in my above-mentioned patent, the teachings of which are incorporated herein by reference.

A brief description follows of the water operated control apparatus of my prior invention. The apparatus includes the provision of moisture sensing means, which may comprise heretofore known porous ceramic or plastic materials that pass air therethrough when dry, but prevent the passage of air therethrough when saturated with water. The moisture sensing means is placed in the soil at a location where soil moisture content is to be sensed. An air conduit is connected between the moisture sensing means and a chamber within a housing. The housing chamber is also connected to a supply of water. In the prior invention, the supply of water was the water discharge attendant operation of an irrigation control apparatus or merely any source of water under pressure. A drain line is also placed in communication with the chamber and is provided with a relatively small internal diameter so that water draining from the chamber forms a continuous or uninterrupted column of water which, by its weight, is able to pull a partial vacuum in the chamber when air is not being introduced into the chamber by the associated sensing means or air valve. Pneumatically operated means, including a diaphragm, is disposed in the housing in a manner such that the diaphragm moves from a normal rest position in response to changing pressure conditions within the chamber relative to ambient or atmospheric pressure outside the chamber. Movement of the diaphragm may be employed to open or close the water supply to the chamber or to operate associated electrical or mechanical means which in turn may be connected to other control devices. The water operated control device 100 of the present invention is similar in operation to the above-described water operated control apparatus of my prior invention, however, the present device additionally employs gravity biasing means.

Gravity biasing means are provided for making the water operated control device pressure responsive. The gravity biasing means of the preferred embodiment of the prevent invention includes a weight 160 shown in FIG. 3 which biases the diaphragm 130 against the nozzle, whereby water under pressure is prevented from being introduced into the top chamber 122 except upon application of water pressure equal to or in excess of a predetermined level. The predetermined level being dependent upon the mass of the weight 160.

Referring again to FIG. 1, the water operated control device 100 is shown with an air tube 102 connected to the control device 100 which allows the communication of air through the air valve 101. The air valve being composed of a commonly used porous ceramic material which passes air when dry and does not pass air when moist, the point at which air will no longer be passed being a function of the pore size of the porous ceramic material 101.

The porous ceramic material 101 provides a means for relaying moisture responsive information to the water operated pilot valve 29. This is accomplished by the passage of air through the ceramic material 101 through the air tube 102 to the lower chamber 121 of the control device 100 when the soil is dry. This relieves any partial vacuum in the chambers 121 and 122, thereby allowing water to flow from the nozzle 125. This flow of water from the nozzle 125 causes flow of water in the pilot valve tube 103 which results in the water operated pilot valve 29 being in the open position permitting water from the dispensing conduit 20 to flow therethrough. When the ceramic material 101 is moist, no air is allowed to pass through the air tube 102 thereby allowing the formation of a partial vacuum within the chambers 121 and 122. This partial vacuum compresses the diaphragm 130 upon the nozzle 125 thereby preventing flow of water through the nozzle 125 and preventing flow of water within the pilot valve tube 103. Since water is not allowed to flow in the pilot valve tube 103, the pilot valve 29 is moved to the closed position preventing water from flowing to the sprinkler head 110 from the dispensing conduit 20. The weight 160 provides biasing of the diaphragm 130 at all times toward the nozzle 125. This prevents the passage of water from the nozzle except upon application of sufficient water pressure against the diaphragm 130 from the nozzle 125 to overcome the force exerted by the weight 160 against the nozzle 125.

Now that a general description of the operation of the water operated control device 100 of the present invention as a moisture responsive and pressure responsive means has been given, a more detailed description of the water operated control device 100 of the present invention and its operation follows.

Figure 3:
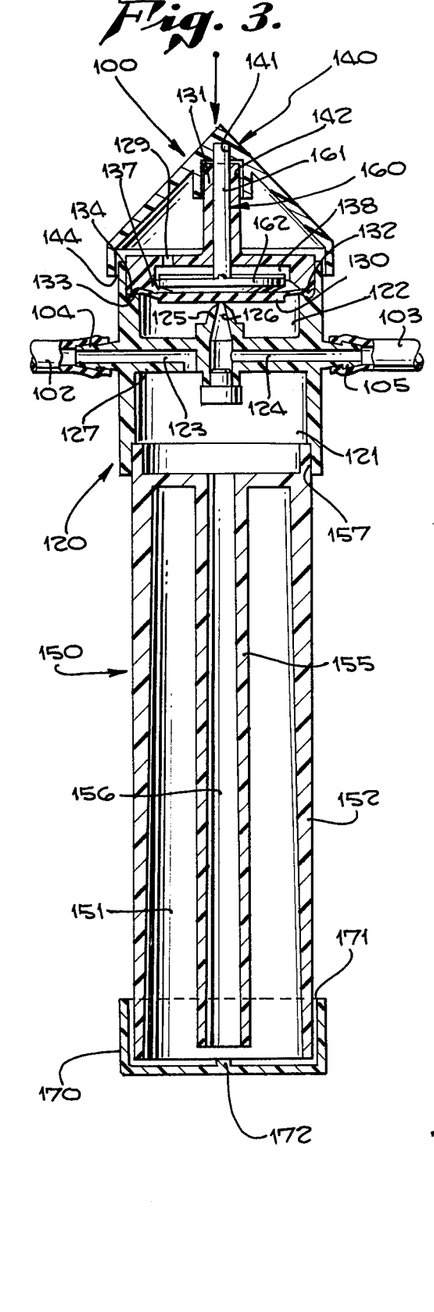
FIG. 3 is a detailed view of the modified water operated control apparatus of FIG. 1 taken in the III—III plane of FIG. 1. This view shows the modified control apparatus in the closed or off position.
Figure 4:
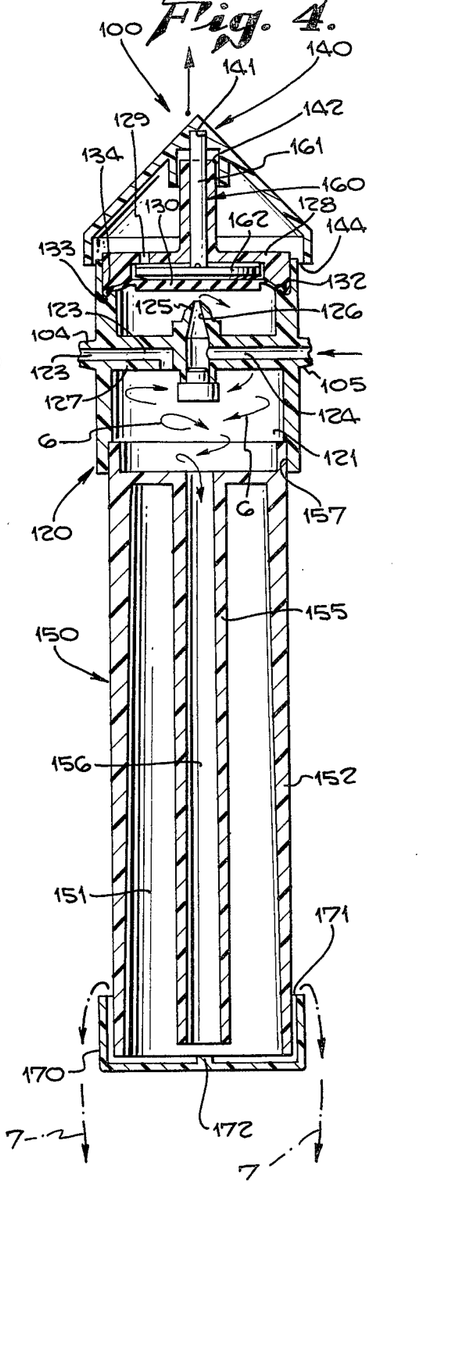
FIG. 4 is the same detailed view as FIG. 3, except the control apparatus is now in the open or on position. The arrows located in the center of FIG. 4 demonstrate that while the control apparatus is in the open position water flows within the control apparatus and the flow takes the form of a swirling motion.

Referring to FIGS. 3 and 4, the water operated control device shown generally at 100 includes a housing shown generally at 120 having bottom chamber 121 and top chamber 122. A pilot valve tube nipple 105 is provided for attaching the pilot valve tube 103 to the housing 120. On the opposite side of the housing 120 is an air tube nipple 104 providing means for attaching the air tube 102 to the housing 120. A nozzle support structure 127 is provided to support the nozzle 125 within the housing 120. In addition, the nozzle support structure functions to separate the housing 120 into the top chamber 122 and the bottom chamber 121. Inside the top chamber 122 is a diaphragm 130 composed of rubber or some other flexible material. The diaphragm 130 is connected to the housing walls at diaphragm securing surfaces 133. The diaphragm 130 is formed at surfaces 134 for being press fitted between diaphragm securing surfaces 133 on the housing and diaphragm securing surfaces 132 on the housing top 128. The diaphragm 130 could be attached to the interior walls of the housing 120 in any convenient manner, however, in the preferred exemplary embodiment of the present invention, the edges 134 of the diaphragm 130 are pinched between the housing at surface 133 and the housing top 128 at surface 132. The housing top 128 has an orifice 129 for allowing atmospheric pressure to always be present in the portion 137 of the top chamber 122 which is located above the diaphragm 130.

Means are provided for operating the dispensing devices only when water pressure equal to or in excess of a predetermined level is applied to the water dispensing device by way of a weight 160 having a weight face 162 and a weight rod 161. The weight 160 provides gravity biasing against the diaphragm 130. This results in the diaphragm being forced against the nozzle 125 until water pressure within the nozzle reaches a level high enough to force the diaphragm 130 off of the nozzle 125, thereby overcoming the gravity bias of the weight 160 and allowing water to flow from the nozzle 125. It can be seen that as long as water pressure within the pilot valve tube 103 remains below a particular pressure, the diaphragm will remain seated on the nozzle 125 thereby preventing water flow. The weight face 162 when forced up vertically from the nozzle 125 by water pressure flowing through the nozzle orifice 126 moves into a recess 138 in the housing top 128. The weight face 162 is positioned over the diaphragm 130 by the weight rod 161 which is contained within a weight positioning tube 131 on the housing top 128. A cap shown generally at 140 is provided for covering the entire housing assembly 120. The cap has a weight rod receptacle 141 and a weight positioning tube receptacle 142. The cap 140 is wider than the housing 120 to provide for apertures 144 thereby allowing atmospheric pressure to enter into the top chamber portion above the diaphragm 137 via the housing top orifice 129. It can be seen from FIGS. 3 and 4 that as the weight rod moves up vertically, it moves the cap 140 with it, while the weight positioning tube 131 remains stationary thereby providing additional sliding support to the cap 140. The cap 140 functions also as a gravity bias in this preferred embodiment, however, this is not critical. It simply is a means for increasing the weight felt by diaphragm 130 without having to increase the size of the weight 160.

Attached to the bottom of the housing 120 is the base shown generally at 150. The base may be attached by any conventional means such as a pressure tight press fitting as shown at 157. The base has a base chamber 151 with the exterior portion 152 serving as a drain tube support. The drain tube 155 is located centrally having an orifice 156 for permitting a column of water to form therein to create a partial vacuum in the chambers 121 and 122. A base cup 170 is provided at the bottom of the base 150 for substantially sealing the bottom of the base. The base cup 170 is wider than the base 150 thereby providing aperture 171 for allowing overflow of water draining down the drain tube orifice 156 as shown by arrows 7. Additionally, a base cup spacer 172 is provided to ensure that the base drain tube support 152 does not seal against the base cup 170 thereby preventing water overflow from flowing out through the aperture 171.

In operation, if the ceramic material 101 is dry and passing air through channel 123 to the chambers 121 and 122, no partial vacuum is created therein. At this point, the diaphragm is held against the nozzle 125 only by the gravity force exerted by the weight 160. If the water pressure in the pilot valve tube 103 is sufficiently great to lift the diaphragm with its gravity biasing weight 160, then water will flow through the channel 124 to the nozzle orifice 126 and into the upper chamber 122. The allowed flow of water within the pilot valve tube 103 actuates the pilot valve 29 to the open position thereby operating the sprinkler head 110. This provides a means for preventing flow of water to the sprinkler head 110 except when water pressure at the pilot valve 29 is equal to or in excess of a predetermined level, that level being determined by the weight of the gravity biasing weight 160.

Figures 5, 6, 7:
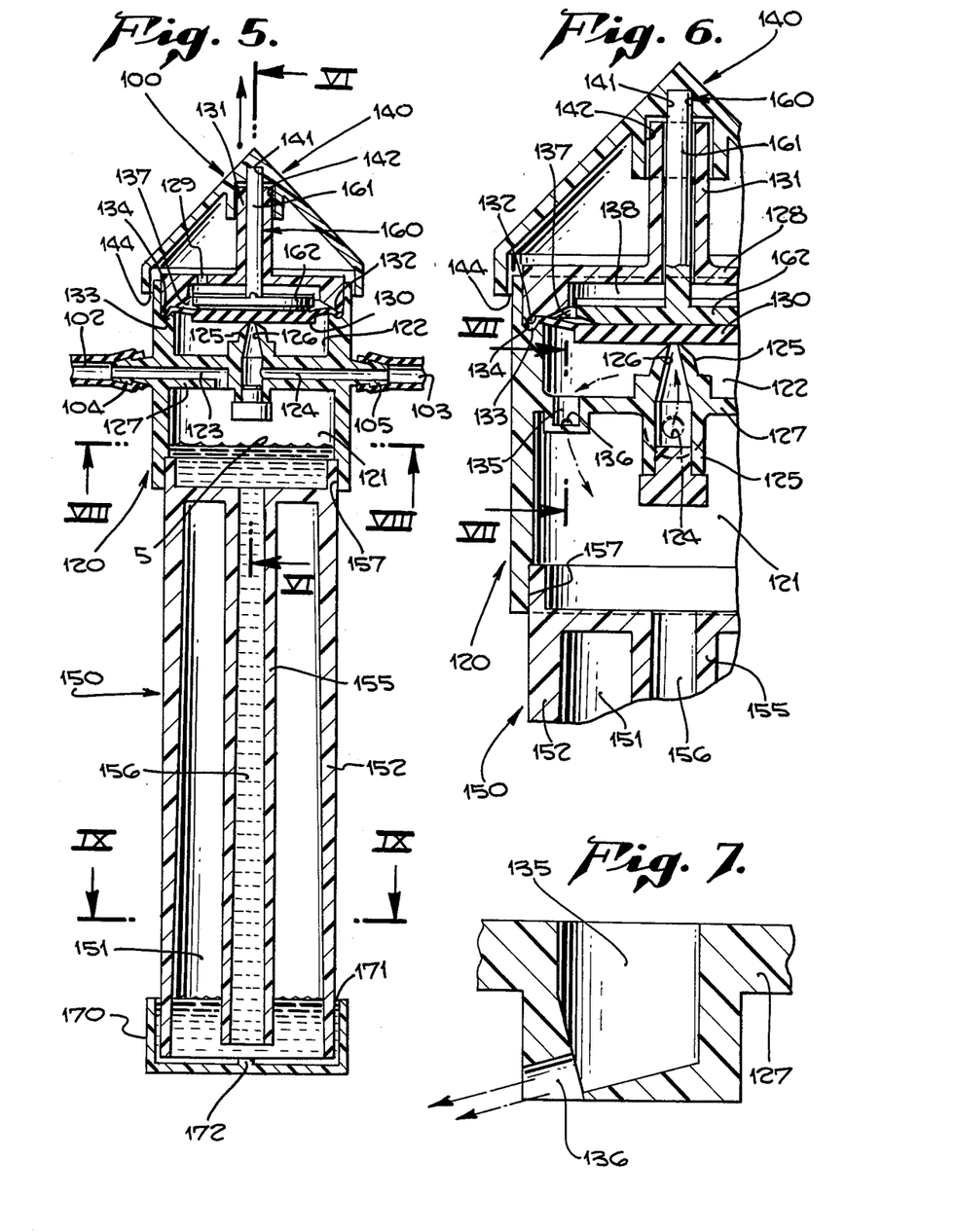
Figure 8:
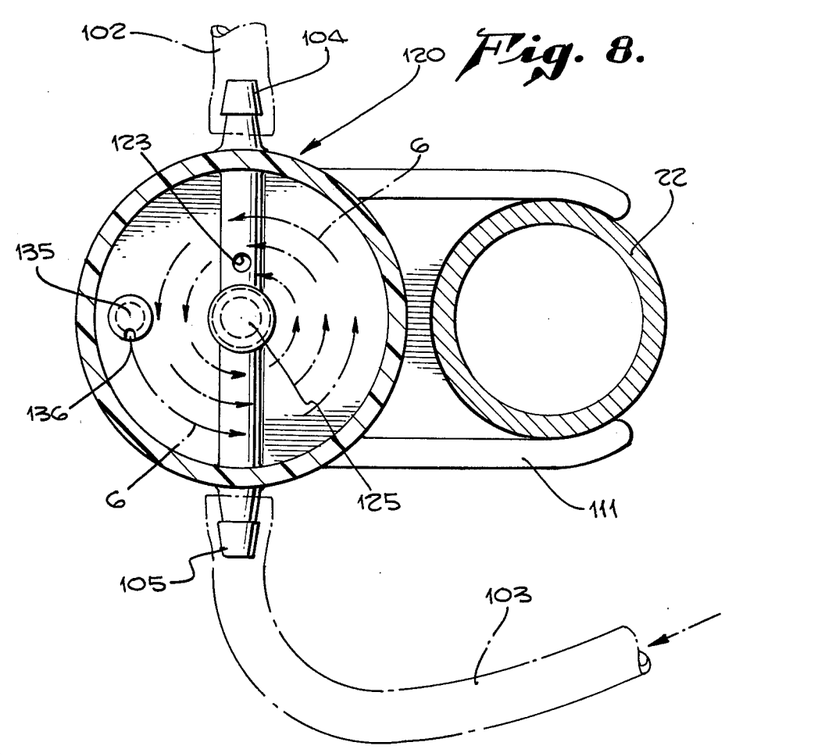
FIG. 8 is a section view of FIG. 5 taken in the plane VIII—VIII of FIG. 5. This view demonstrates from another angle the swirling motion of water within the bottom chamber 121.
Figure 9:
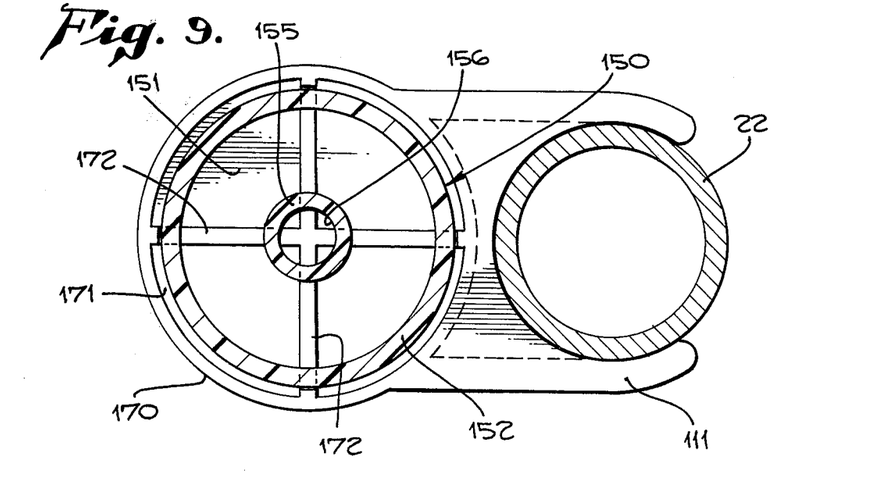
FIG. 9 is a section view of FIG. 5 taken in the IX—IX plane of FIG. 5.

As long as the ceramic material 101 is passing air and the water pressure in the pilot valve tube 103 is sufficiently great, water is allowed to pass from the nozzle 125 into the top chamber 122. The water in the top chamber 122 is allowed to pass into the bottom chamber 121 through a drain cup orifice 136, which leads perpendicularly out of the top chamber drain cup 135 as shown in FIGS. 6 and 7. This particular arrangement of the drain cup 135 and the drain cup orifice 136 provides for a swirling flow of water in the bottom chamber 121 as shown at 6 in FIG. 4. The swirling stream of water 6 provides a larger amount of water within the bottom chamber 121 at any given time than could be expected with a simple straight through orifice drain. Additionally, the orifice 136 functions to create some positive pressure in chamber 122 which gives a snap action effect to the pilot valve 29. It is necessary that the pilot valve 29 be either open or closed. A half-way, in between condition could be very undesirable. The effect of the orifice 136 is, then, as the pressure in the pilot valve tube 103 approaches the point at which the pressure at the nozzle 125 is great enough to force the diaphragm 130 up against the weight 160 and water starts to flow, an additional upward pressure is rapidly created by the restriction caused by the orifice 136. This, then, will push the diaphragm 130 on up fully opening nozzle 125 allowing the connected pilot valve 29 to open rapidly. The system will then stay in this state regardless of any feedback from the moisture sensor 101 until the pressure in the entire distribution system drops to a low level, as it will when the main valve 3 is turned off momentarily.

Once water is flowing from the nozzle 125 and the sprinkler head 110 is dispensing water, the main water supply valve is left on for a period of time such as two hours to allow for complete irrigation of the surrounding area. During this period of time, the water continues to flow from the nozzle orifice 126 down through the top chamber drain cup 135 and through the drain cup orifice 136 into the bottom chamber 121 in a swirling motion 6, then down through the drain tube orifice 156 and subsequently out of the base entirely through the apertures 171 between the base 150 and the base cup 170. When the main water supply valve 3 is subsequently shut off, water stops flowing from the nozzle orifice 126, however, the swirling stream of water 6 continues for a short time after and if the area is sufficiently irrigated, the ceramic material 101 will no longer be passing air and the swirling stream 6 will form a pool of water 5, as shown in FIG. 5, at the top of the drain tube orifice 156 which is now also full of water. The water in the drain tube orifice 156 and the pool of water 5 in the bottom chamber 121 combine their weights to apply a partial vacuum to the chambers 121 and 122. When the main water supply valve 3 is subsequently turned back on after a short period of time, the partial vacuum in the chambers 121 and 122 in combination with the gravity biasing of the weight 160 against the diaphragm prevent flow of water from the nozzle orifice 126. Since water is no longer permitted to flow from the pilot valve tube 103, the water operated pilot valve 29 is placed in the closed position thereby preventing water from reaching the sprinkler head 110.

Alternatively, a drain tube 155 could be used that was sufficiently long to provide creation of a vacuum in the chambers 121 and 122 sufficiently great to compress the diaphragm 130 against the nozzle 125 while water was still flowing therefrom. This would provide a system where the pilot valve 29 would respond to the moisture sensor 101 to turn off the water even when the main valve 3 is in the open position. Additionally, the orifice 136 would have to be considerably enlarged. There could be situations where this alternative system would be desirable, especially situations where it is not feasible or desirable to continually open and close the main valve 3. However, in the preferred exemplary embodiment of the present invention, the swirling stream of water 6 provides additional water weight for creating a vacuum within the chambers 121 and 122 only upon the closing of the main water supply valve 3. Once water is flowing from the nozzle orifice 126, the drain tube orifice 156 does not have sufficient volume to create a vacuum sufficient to pull the diaphragm 130 against the nozzle 125. However, when the swirling water 6 is allowed to form a pool 5, by switching off the main valve 3 this additional water combines with the water already in the drain tube orifice to create a vacuum sufficient to keep the diaphragm 130 compressed on the nozzle 125 when water pressure is again supplied, as the main valve 3 is turned on.

As above described, it can be seen that the pressure responsive means and moisture responsive means for operating the sprinkler head 110 are provided in one air actuated device 100. Certainly alternative embodiments could employ two separate units to accomplish the same function or employ electric or other energy means for accomplishing the switching. However, the concept of the present invention remains to provide water over a given agricultural area in response to moisture demand in various sections of the area and additionally to prevent overload of the system resulting in a pressure drop below optimum pressure ranges by operation of individual portions of the system in response to water pressure therein.

As can be seen by the above-described preferred exemplary embodiment of the irrigation system and method of the present invention, an entirely automatic irrigation system requiring no electrical switching, responsive to moisture demands within the system, responsive to water pressure in the system and utilizing minimal diameter conduits is disclosed.

Having thus described the preferred exemplary embodiment of the present invention, it should be noted by those skilled in the art that the within disclosures are exemplary only and that various other alternatives, adaptations and modifications may be made within the scope of the present invention which is defined and limited only by the following claims.

I claim:

1. A method of irrigation which is responsive to moisture variations within the environment of said system and maintains water pressure within said system at or above a predetermined level by selective operation of portions of said system comprising the steps of:

placing one or more dispensing devices at spaced locations, said dispensing devices being in water supply relation with a water supply source, said supply source supplying water under pressure;

connecting a pilot valve to each said dispensing device for operation between closed and open positions; and controlling said pilot valve by operating a device responsive to moisture in the surrounding environment and calibrated to provide opening of said pilot valve only when the water pressure at said dispensing device is equal to or in excess of a predetermined level.

2. An irrigation system having a plurality of dispensing devices located at spaced locations for distributing water under pressure from a supply source comprising:

an arterial conduit defining a closed conduit loop in fluid communication with said supply source;

dispensing conduit having a plurality of members with each said member having both ends in fluid communication with said arterial conduit;

means for connecting said dispensing conduit members to said arterial conduit wherein water flow within said arterial conduit is not obstructed;

means for connecting one or more of said dispensing devices to said dispensing conduit members wherein water flow within said members is not obstructed;

pilot valve means for individually switching said dispensing devices between on and off operation; and control valve means for operating said pilot valve means in response to moisture in the soil surrounding each said dispensing device and in response to water pressure in said dispensing conduit adjacent each of said dispensing device.

3. In a water operated control apparatus for operating a diaphragm means of an air actuated device in response to variations in the moisture content of an associated moisture sensitive valve whose ability to pass air varies dependent upon its moisture content level and having housing means for forming a pressure chamber in fluid pressure responsive relation to said diaphragm means and in air flow communication with said moisture valve, water inlet means for connecting said housing means to a supply of water under pressure for introducing water into said housing means and means for varying air pressure in said pressure chamber subject to air flow through said air valve relative to said chamber, said means comprising a column of water wherein the improvement comprises:

gravity biasing means for biasing said diaphragm means to a position wherein said water under pressure is prevented from being introduced through said water inlet means into said housing means, said biasing means being released upon application of said water under pressure equal to or in excess of a predetermined pressure against said diaphragm means.

4. The improved water operated control apparatus of claim 3 wherein said improved apparatus is used to control a water operated pilot valve for operating dispensing devices in an irrigation system.

* * * * *